Figure 1:
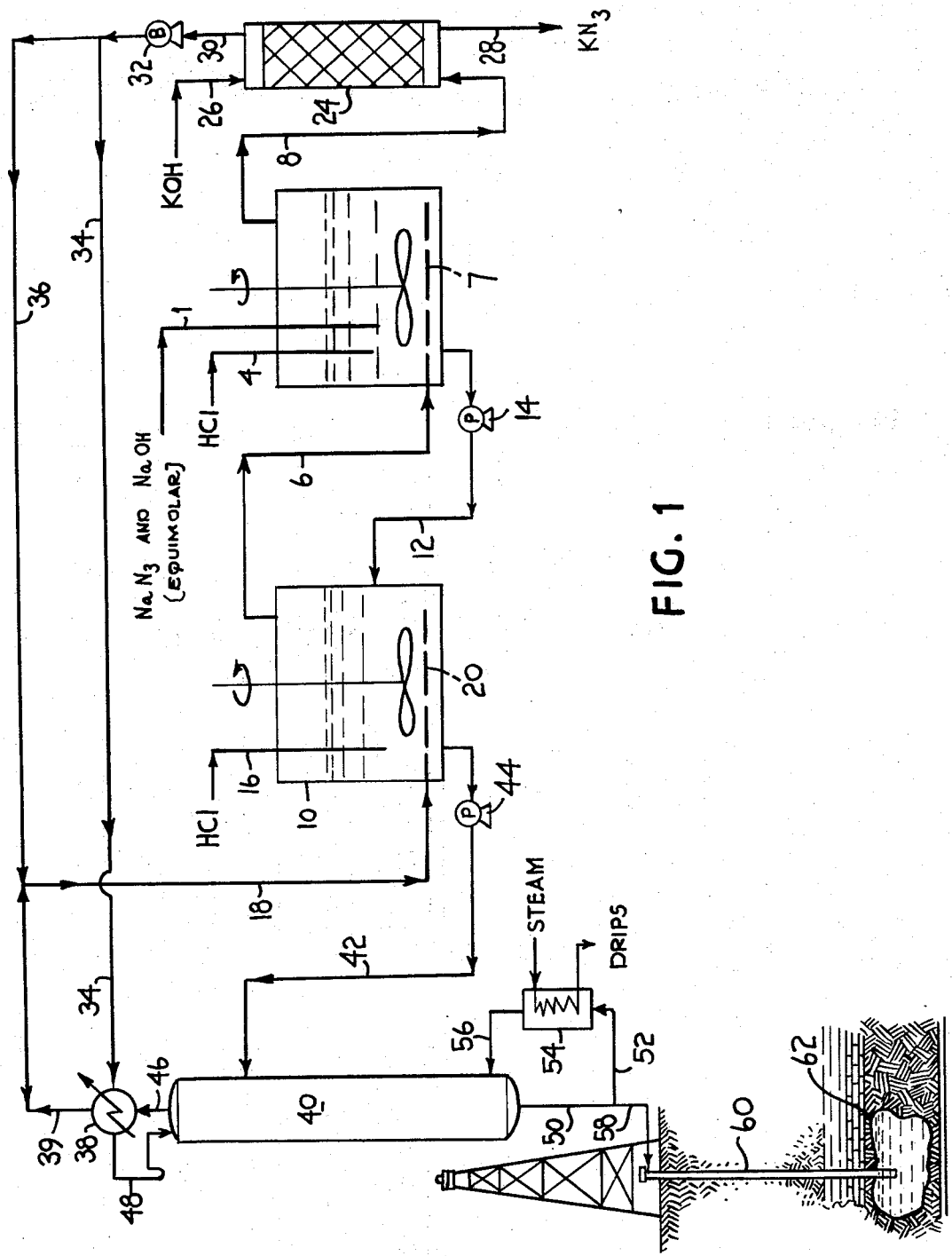

United States Patent [19]
Dehn

[11] 3,768,865
[45] Oct. 30, 1973

[54] PROCESS FOR THE DISPOSAL OF SALT SOLUTIONS CONTAMINATED WITH AZIDE

[75] Inventor: Frederick C. Dehn, New Martinsville, W. Va.

[73] Assignee: PPG Industries, Inc., Pittsburgh, Pa.

[22] Filed: July 13, 1972

[21] Appl. No.: 271,436

Related U.S. Application Data

[63] Continuation-in-part of Ser. No. 92,371, Nov. 24, 1970, abandoned.

[52] U.S. Cl. .......................... 299/4, 23/157, 61/0.5, 166/305 D
[51] Int. Cl. ............................................ E21b 43/28
[58] Field of Search ........................................ 61/0.5; 23/157–163, 190, 191, 356, 360; 299/4, 5; 166/305 D

[56] References Cited
UNITED STATES PATENTS

| 2,348,161 | 5/1944 | Van Duzee | 166/305 D |
| 3,196,619 | 7/1965 | Shock | 61/.5 X |
| 3,135,501 | 6/1964 | Dahms et al. | 299/4 |

*Primary Examiner*—Ernest R. Purser
*Attorney*—Russell A. Eberly

[57] ABSTRACT

The disposal of salt solutions contaminated with azide is accomplished by depositing the solution in a subterranean cavity, maintaining the solution in the subterranean cavity until it is essentially free of azide, and pumping the essentially azide-free solution to the surface.

18 Claims, 2 Drawing Figures

INVENTOR
FREDERICK C. DEHN

Patented Oct. 30, 1973

3,768,865

2 Sheets-Sheet 2

INVENTOR
FREDERICK C. DEHN

BY
ATTORNEYS

PROCESS FOR THE DISPOSAL OF SALT SOLUTIONS CONTAMINATED WITH AZIDE

CROSS-REFERENCE TO RELATED APPLICATION

This application is a continuation-in-part of the application Ser. No. 92,371, filed Nov. 24, 1970 and now abandoned.

Those engaged in axide chemistry are often faced with the disposal of a salt solution contaminated with azide. Usually the salt is a by-product of a process wherein a metal azide, an organic azide, or hydrazoic acid is produced. Potassium azide, for example, may be produced from sodium azide and potassium carbonate by metathesis. The resulting by-product sodium carbonate often contains small amounts of azide as a contaminant which greatly enhances the problem of disposal.

Hydrazoic acid is becoming of increasing importance primarily as an intermediate in the preparation of various azide compounds such as its salts. Hydrazoic acid is bioactive and may be produced for those purposes. One particularly favorable use for hydrazoic acid is the preparation of alkali metal azide or alkaline earth metal azide by contacting the hydrazoic acid with the appropriate basic compound such as the hydroxide.

Hydrazoic acid may be prepared by several processes for which the basic chemistry is known. However, refinements must be made to the laboratory processes employing the basic chemistry in order to achieve a commercially successful plant capable of producing sizable amounts of hydrazoic acid. One of the known laboratory methods for producing hydrazoic acid is the acidification of at least one alkali metal azide or alkaline earth metal azide with an acid such as one or more of the strong mineral acids Such a process without further refinement presents a problem with respect to safe disposal of the by-product salt of the acid which is almost always more or less contaminated with azide.

It is the purpose of this invention to provide a safe and efficient method of disposal of azide-contaminated salt. It has now been found that the azide-contaminated salt may be disposed of by depositing a solution of the same in a subterranean cavity. Wells are admirably suited for the purpose. The subterranean cavity should be deep within the earth so that the solution will not be mixed to any substantial degree with surface ground waters. Most subterranean cavities used for the practice of this invention are at least 300 feet from the surface of the earth. More often, they are at least 500 feet deep. It is preferred that they be at least 1,000 or even 1,500 feet below the surface.

Many wells especially suitable for the practice of this invention have been or are presently used for the solution mining of salts. Examples of such salts are sodium chloride, potassium chloride, and sodium carbonate. Wells used for the recovery of sulfur by the Frasch process are also satisfactory. These wells may be abandoned for production purposes. Alternatively, the well may be located in an active field where one or more other wells are currently producing. In either case, the by-product salt from the production of hydrazoic acid may be the same or different from the salt produced from the field.

In a preferred embodiment of this invention, the salt is the same as the principal salt comprising the subterranean deposit. Because hydrazoic acid is most often prepared from sodium azide, it is convenient to use hydrochloric acid as the feed acid and to deposit solutions of the by-product sodium chloride in a sodium chloride well. The azide contaminant often decomposes with the passage of a short time, usually a matter of a few weeks or months. Rarely does azide persist longer than about four weeks. Upon reduction of the azide concentration to an insignificant value, e.g., 30 parts per billion parts of by-product salt, the well may be placed into production retrieving most of the salt deposited. If the solution pumped into the well was not saturated, additional salt values would also be recovered. Of course, the acceptable value for an insignificant concentration will vary depending upon the use to which the brine is put. In a producing field where a large cavity is connected to the surface by at least two wells, azide contaminated salt solution may be pumped into the cavity through one well while the other well is producing. If the average residence time is on the order of the time it takes the azide to decompose, the azide concentration can be brought to a very low value. The large amount of dilution taking place also aids in reducing the azide concentration.

Often two relatively large chambers are connected by a narrow passageway. One or more wells connect each chamber with the surface. Such a system is customarily operated by pumping water into one chamber and pumping brine from the other chamber to the surface. If at least some of the water pumped into the first chamber is substituted by the azide contaminated by-product salt solution from the production of hydrazoic acid, the principles of dilution and residence time may be utilized to achieve a satisfactorily low azide level by the time the solution is withdrawn from the other chamber.

Figure 2:
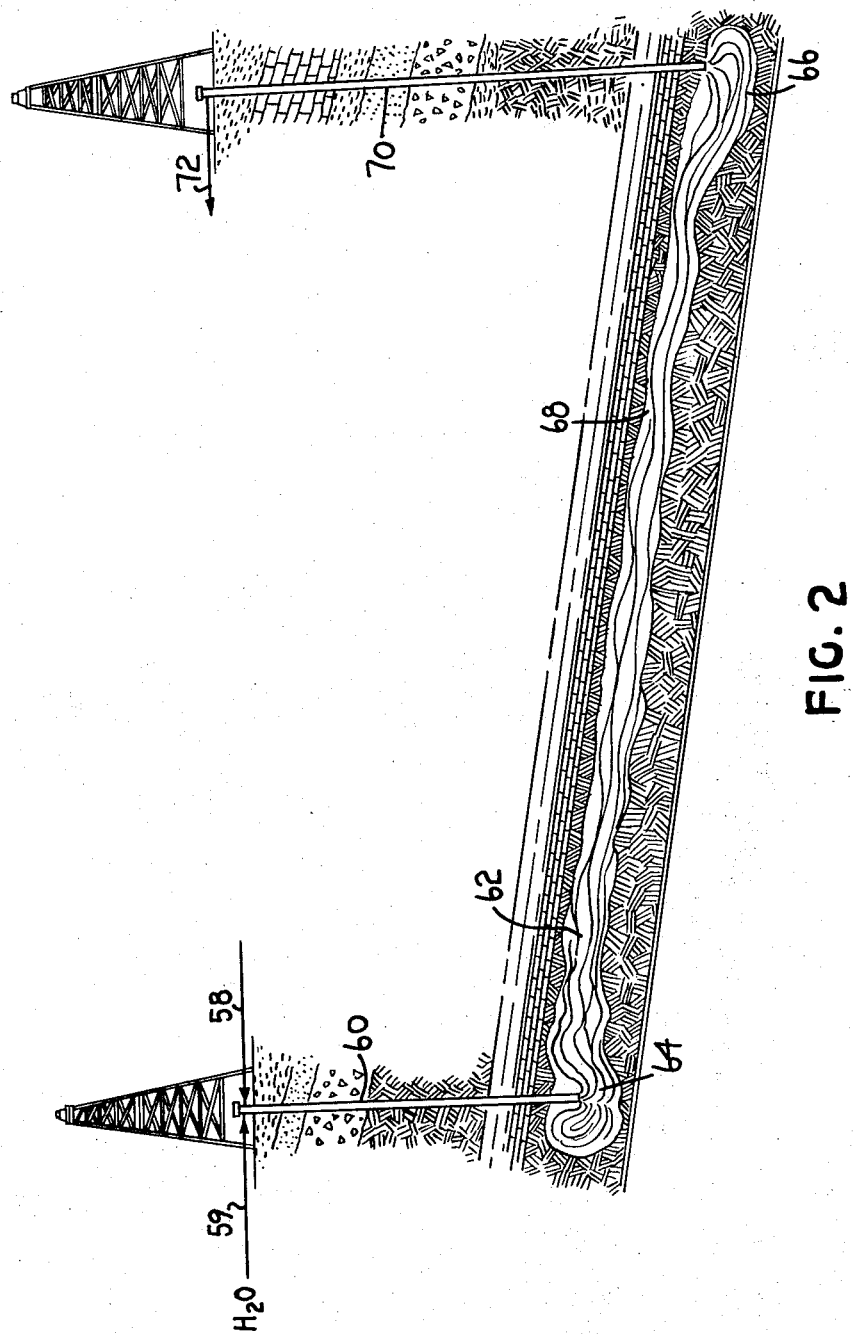

The basic principles of the present invention are illustrated by reference to the drawings wherein like numbers refer to like parts and wherein FIG. 1 represents a process within the contemplation of the present invention and FIG. 2 represents a modification to the process of FIG. 1.

The process illustrated in FIG. 1 shows the formation of hydrazoic acid by acidifying sodium azide with hydrochloric acid. The hydrazoic acid so produced is contacted with potassium hydroxide to produce potassium azide, although the hydrazoic acid can be put to a number of other uses. Because sodium azide produced by the Wislicenus method produces one mole of sodium azide produced, it is often convenient to acidify the mixture rather than separate the sodium hydroxide from the sodium azide before acidifying the sodium azide. If the sodium hydroxide is not removed, additional acid will be required to neutralize it when the sodium azide is acidified.

Referring now in more detail to FIG. 1, equimolar portions of sodium azide and sodium hydroxide are fed through line 1 to mix tank 2 where they are contacted with hydrochloric acid introduced through line 4. A gas stream containing mostly nitrogen, a small percentage (usually about 3 per cent) of hydrazoic acid, some water vapor, and some hydrogen chloride is introduced through line 6 and sparger 7 and bubbled through the mixture in mix tank 2 to dilute any hydrazoic acid formed and sweep it from the mix tank through line 8. Because hydrazoic acid is explosive in concentrated amounts, dilution by an inert gas such as nitrogen, helium, argon, neon, xenon, krypton, air, methane, ethane, water vapor, $CF_4$, $CF_3Cl$, or mixtures thereof is desirable to reduce the possibility of an explosion. The gas in line 8 advantageously contains about 5 to 8 per cent hydrazoic acid. Greater or lesser proportions may be used if desired. Liquid from mix tank 2 having a pH of about 5 to 6 is forwarded to mix tank 10 through line 12 by pump 14. Hydrochloric acid is introduced through line 16 to lower the pH of the reaction mixture to about 2 to 3. Nitrogen containing small amounts of hydrazoic acid and water vapor is introduced through line 18 and sparger 20 to sweep hydrazoic acid from mix tank 10 through line 6 and into the mixture ccontained in mix tank 2. A gas stream including nitrogen, hydrazoic acid, and water vapor is passed through line 8 to scrubber 24 where it is contacted with aqueous potassium hydroxide introduced through line 26. The scrubber may be of any of many conventional designs such as, for example, bubble plate column, sieve tray column, packed column, spray column, disc and donut column, or liquid filled column. Flow may be either countercurrent or parallel. In FIG. 1 a packed column utilizing countercurrent flow is shown. Potassium azide solution removed from scrubber 24 through line 28 may be used directly as an aqueous solution or it may be forwarded for further processing such as crystallization, drying, and packaging. Nitrogen, some water vapor, and a small amount (on the order of about 1 per cent) hydrazoic acid are removed from scrubber 24 through line 30 where they are forwarded by blower 32 to lines 34 and 36. Most of the gas leaving the scrubber 24 passes through line 36 to line 18 and thence into mix tank 10. A minor portion of the gas leaving scrubber 24 passes through line 34, through condenser 38 of stripping column 40, through line 39, and on to line 18 where it combines with the gas flow from line 36 for passage through the liquid in mix tank 10. It may be seen that nitrogen is recycled through mix tanks 2 and 10 and through scrubber 24, thereby containing most of the hydrazoic acid within the system. Make-up nitrogen may be added at any convenient location in the nitrogen system. Should there be any build-up of inert gases in the nitrogen system, the excess may be vented, preferably through a basic solution, to neutralize any hydrazoic acid present. Liquid from mix tank 10 usually contains some dissolved hydrazoic acid which is often advantageously recovered. Stripping column 40 is suitable for this purpose. The stripping column itself is of conventional design and may be a bubble cap column, a sieve tray column, a packed column, or some similar device. Liquid from mix tank 10 is passed through line 42 by pump 44 and introduced to stripping column 40 at or near the top thereof. Vapor taken overhead is passed through line 46 to condenser 38. Condenser 38 is preferably run at total reflux. Reflux may be returned to stripping column through line 48. Nitrogen from line 34 is passed through condensr 38 where it entrains non-condensibles and hydrazoic acid and passes through lines 39 and 18 to mix tank 10. Bottoms, comprising principally sodium chloride solution, are removed from the stripping column through line 50 and split into two streams. One of these streams passes through line 52 to reboiler 54 where it is heated and returned to stripping column 40 through line 56. The other stream passes through line 58 to a salt (NaCl) well where it is passed through shaft 60 and deposited in subterranean cavity 62. While stripping column 40 has been shown to aid in the recovery of hydrazoic acid values, its use is not mandatory and it may be omitted. Under such circumstances, line 42 would be connected directly to shaft 60.

FIG. 2 shows a modification of the process described with reference to FIG. 1. In FIG. 2 shaft 60 of a first well is shown connecting line 58 with chamber 64 of subterranean cavity 62. Subterranean cavity 62 comprises chambers 64 and 66 connected by passageway 68. Shaft 70 of a second well connects line 72 with chamber 66. In operation, bottoms liquid from stripping column 40 is passed through line 58 and usually after being diluted with water, introduced through line 59 is passed through shaft 60 into chamber 64. The solution continues its way through passageway 68 into chamber 66. By the time the solution is removed from chamber 66 through shaft 70, it is saturated or almost saturated with salt and its azide content has decreased to insignificant values. Salt solution is taken from shaft 70 and passed through line 72 for further processing and reclaiming of the salt values.

The above by-product salt disposal system has been described with respect to a continuous process for producing hydrazoic acid, but the principles are equally applicable to a batch process. Similarly, deposition in the well may be conducted either batchwise or continuously.

Although the detailed process for the production of hydrazoic acid which has been described has been incorporated into an over-all process for converting sodium azide into potassium azide using hydrazoic acid as an intermiediate, it will be appreciated that flexibility is an outstanding advantage. By varying the identities of the feed azide and the base fed to the scrubber, a large number of azides may be converted to other azides. Thus, an alkali metal azide may be converted into another alkali metal azide as shown in detail herein, alkali metal azide may be converted into alkaline earth metal azide, alkaline earth metal azide may be converted to alkali metal azide, and alkaline earth metal azide may be converted to another alkaline earth metal azide. Even the same azide as the feed azide may be regenerated by scrubbing with the appropriate base. Feed azide suitable for use in this invention include lithium azide, sodium azide, potassium azide, rubidium azide, cesium azide, beryllium azide, magnesium azide, calcium azide, strontium azide, and barium azide. Of the alkali metal azides, sodium azide and potassium azide are most often used. Sodium azide is preferred. Of the alkaline earth metal azides, magnesium azide, calcium azide, strontium azide, and barium azide are most often used. Magnesium azide and calcium azide are preferred. Of course, mixtures of azides are suitable for use.

The base selected for feeding to the scrubber may be any soluble hydroxide or salt of the alkali metals or alkaline earth metals which will react to form the azide. Exemplary salts are the soluble carbonates such as sodium carbonate or potassium carbonate. Even slightly water soluble compounds such as calcium carbonate or magnesium carbonate may be used. It is convenient to utilize a slurry of the slightly-soluble salts which react with hydrazoic acid in order to promote both mutual contact of the salt and hydrazoic acid and ease of handling. Examples of compounds suitable for feeding to the scrubber include lithium hydroxide, sodium hydroxide, potassium hydroxide, rubidium hydroxide, cesium hydroxide, magnesium hydroxide, calcium hydroxide, strontium hydroxide, barium hydroxide, dimethylberyllium (anhydrous solvent), diethylmagnesium (anhydrous solvent), magnesium carbonate, and calcium carbonate.

While the invention has been described with reference to certain illustrative embodiments, it is not intended that it shall be limited thereby except insofar as appears in the accompanying claims.

I claim;

1. A method comprising
   a. depositing a soution of an azide comtaminated salt in a subterranean cavity;
   b. maintaining said solution in said subterranean cavity until the solution is essentially free of azide; and
   c. pumping said essentially azide-free solution to the surface.

2. In the method of preparing hydrazoic acid from a feed azide selected from the group consisting of alkali metal azide and alkaline earth metal azide wherein said feed azide is contacted with a feed acid to genrate hydrazoic acid and a by-product salt of said feed acid contaminated with azide, the improvement comprising:
   a. depositing a solution of said azide contaminated by-product salt in a subterranean cavity;
   b. maintaining said solution in said subterranean cavity until the solution is essentially free of azide; and
   c. pumping said essentially azide-free solution to the surface.

3. The method of claim 2 wherein the feed acid is a strong mineral acid.

4. The method of claim 2 wherein the feed acid is hydrochloric acid.

5. The method of claim 2 wherein said subterranean cavity is an abandoned salt well.

6. The method of claim 2 wherein the by-product salt is the same as the principal salt of the subterranean deposit containing the subterranean cavity.

7. The method of claim 6 whrein the by-product salt is sodium chloride.

8. The method of claim 6 wherein the by-product salt is potassium chloride.

9. The method of claim 6 wherein the subterranean cavity is connected to the surface of the earth by at least two wells and wherein said solution is passed down one well into the cavity and salt solution is withdrawn from said subterranean cavity through said second well.

10. The method of claim 9 wherein both wells are operating simultaneously.

11. The method of claim 9 wherein the by-product salt is sodium chloride.

12. The method of claim 9 wherein the subterranean cavity is at least 1,500 feet below the surface of the earth.

13. The method of claim 9 wherein the by-product salt is potassium chloride.

14. The method of claim 2 wherein said subterranean cavity is at least 300 feet below the surface of the earth.

15. The method of claim 2 wherein the subterranean cavity is at least 1,500 feet below the surface of the earth.

16. In the method of preparing potassium azide from sodium azide wherein the sodium azide is contacted with hydrochloric acid to generate hydrazoic acid and form by-product sodium chloride contaminated with azide and wherein said hydrazoic acid is contacted with potassium hydroxide to produce potassium azide, the improvement comprising:
   a. depositing a solution of said azide contaminated by-product sodium chloride in a subterranean cavity;
   b. maintaining said solution in said subterranean cavity until the solution is essentially free of azide; and
   c. pumping said essentially azide-free solution to the surface.

17. The method of claim 16 wherein said subterranean cavity is located in a subterranean sodium chloride deposit.

18. The method of claim 17 wherein said subterranean cavity is located at least 1,500 feet below the surface of the earth.

* * * * *